(12) United States Patent
Lee

(10) Patent No.: US 9,428,125 B2
(45) Date of Patent: Aug. 30, 2016

(54) APPARATUS AND METHOD FOR WARNING REDUCTION IN FUEL EFFICIENCY OF VEHICLE

(71) Applicant: Hyundai Motor Company, Seoul (KR)

(72) Inventor: Young Jin Lee, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 96 days.

(21) Appl. No.: 14/293,717

(22) Filed: Jun. 2, 2014

(65) Prior Publication Data

US 2015/0130603 A1 May 14, 2015

(30) Foreign Application Priority Data

Nov. 13, 2013 (KR) ........................ 10-2013-0137690

(51) Int. Cl.
*B60Q 1/00* (2006.01)
*B60R 16/023* (2006.01)

(52) U.S. Cl.
CPC ... *B60R 16/0236* (2013.01); *B60K 2350/1092* (2013.01)

(58) Field of Classification Search
None
See application file for complete search history.

(56) References Cited

U.S. PATENT DOCUMENTS

| 8,311,722 B2* | 11/2012 | Zhang | B60W 40/09 701/104 |
| 8,606,459 B2* | 12/2013 | Sekiyama | B60R 16/0236 340/425.5 |
| 8,615,345 B2* | 12/2013 | MacNeille | G01C 21/3453 701/36 |
| 8,660,784 B2* | 2/2014 | Newhouse | G01L 3/26 340/439 |
| 8,892,341 B2* | 11/2014 | McClellan | G07C 5/0816 701/115 |
| 9,129,460 B2* | 9/2015 | McClellan | G07C 5/008 |
| 2007/0089527 A1* | 4/2007 | Shank | B60N 2/002 73/780 |
| 2008/0120011 A1* | 5/2008 | Iwase | B60K 6/40 701/102 |
| 2008/0120175 A1* | 5/2008 | Doering | B60R 16/0236 705/14.67 |
| 2009/0157267 A1* | 6/2009 | Shin | B60W 50/0098 701/51 |
| 2011/0035137 A1* | 2/2011 | Konishi | F02N 11/0818 701/115 |
| 2011/0153175 A1* | 6/2011 | Zhang | B60W 40/09 701/70 |

(Continued)

FOREIGN PATENT DOCUMENTS

| JP | 2003-312253 A | 11/2003 |
| JP | 2008-260314 A | 10/2008 |
| KR | 10-1999-0059400 A | 7/1999 |

(Continued)

OTHER PUBLICATIONS

"Development of a Driving Guide for Improving the Fuel-Economy of Passenger Cars (Final Report)," Ministry of Commerce, Industry and Energy, Jul. 28, 2004, 157 pgs. with partial English translation.

*Primary Examiner* — Fekadeselassie Girma
*Assistant Examiner* — Chico A Foxx
(74) *Attorney, Agent, or Firm* — McDermott Will & Emery LLP

(57) ABSTRACT

An apparatus for warning reduction in fuel efficiency of a vehicle includes a driving sensor configured to sense driving of the vehicle. A window position sensor is configured to sense an opened degree of each window in the vehicle. A controller is configured to enable a fuel efficiency reduction predictor when the window position sensor senses that a window of the vehicle is opened, in the state in which the driving sensor senses the driving of the vehicle, the fuel efficiency reduction predictor predicting reduction in fuel efficiency depending on the opened degree of each window sensed by the window position sensor.

9 Claims, 2 Drawing Sheets

(56) References Cited

U.S. PATENT DOCUMENTS

| | | | |
|---|---|---|---|
| 2014/0111126 A1* | 4/2014 | Sankaran | B60L 15/02 318/400.09 |
| 2014/0226831 A1* | 8/2014 | Tzirkel-Hancock | G10K 11/002 381/71.7 |

FOREIGN PATENT DOCUMENTS

| | | |
|---|---|---|
| KR | 10-2004-0053918 A | 6/2004 |
| KR | 10-2004-0065876 A | 7/2004 |
| KR | 10-0507173 B1 | 8/2005 |

* cited by examiner

APPARATUS AND METHOD FOR WARNING REDUCTION IN FUEL EFFICIENCY OF VEHICLE

CROSS-REFERENCE TO RELATED APPLICATION

This application is based on and claims the benefit of priority to Korean Patent Application No. 10-2013-0137690, filed on Nov. 13, 2013 in the Korean Intellectual Property Office, the disclosure of which is incorporated herein in its entirety by reference.

TECHNICAL FIELD

The present disclosure relates to an apparatus and a method for warning reduction in fuel efficiency of a vehicle, and more particularly, to a technology of predicting reduction in fuel efficiency depending on an opened degree of a driver's side window, a passenger's side window, and a rear side window of a vehicle while driving and displaying the case in which a predicted value exceeds a preset limit on a cluster to issue a warning to a driver.

BACKGROUND

Drivers have been paying attention to fuel efficiency of a vehicle due to the recent surge in oil prices and roughly are aware of the fuel efficiency of the vehicle as "mileage (km)/lubrication amount (L)".

The fuel efficiency, which is separately designated in vehicle models, merely represents fuel consumption under specific driving condition and does not represent fuel consumption considering driving habits for each driver. The fuel efficiency of the vehicle has been considerably affected by usual driving habits of a driver, such as a frequency of a sudden start and a sudden acceleration, a driving speed, and the like and has a considerable difference depending on a road condition or a driving condition. In particular, the case in which the vehicle is driven while a window of the vehicle is opened has been recognized as a main factor of reducing the fuel efficiency of the vehicle.

Therefore, a need exists for a technology of sensing an opened degree of the window of the vehicle, predicting the reduction in the fuel efficiency, and warning the reduction in the fuel efficiency to the driver.

SUMMARY

The present disclosure has been made to solve the above-mentioned problems occurring in the prior art while advantages achieved by the prior art are maintained intact.

An aspect of the present disclosure provides an apparatus and a method for warning reduction in fuel efficiency of a vehicle capable of predicting the reduction in the fuel efficiency depending on an opened degree of a driver's side window, a passenger's side window, and a rear side window of the vehicle while driving and displaying the case in which a predicted value exceeds a preset limit on a cluster to issue a warning to a driver, thereby preventing the fuel efficiency from reducing due to the opening of the window.

According to an exemplary embodiment of the present disclosure, an apparatus for warning reduction in fuel efficiency of a vehicle includes a driving sensor configured to sense driving of the vehicle. A window position sensor is configured to sense an opened degree of each window in the vehicle. A controller is configured to enable a fuel efficiency reduction predictor when the window position sensor senses that a window of the vehicle is opened, in the state in which the driving sensor senses the driving of the vehicle, the fuel efficiency reduction predictor predicts the reduction in the fuel efficiency depending on the opened degree of each window sensed by the window position sensor. A warning determiner is configured to generate a warning signal depending on that a sum of each reduction in fuel efficiency predicted by the fuel efficiency reduction predictor exceeds a threshold value. A warner is configured to issue a warning to a driver depending on the warning signal from the warning determiner.

According to another exemplary embodiment of the present disclosure, a method for warning reduction in fuel efficiency of a vehicle includes sensing, by a driving sensor, driving of the vehicle. An opened degree of each window in the vehicle is sensed by a window position sensor. Reduction in the fuel efficiency depending on an opened degree of each window is predicted by a fuel efficiency reduction predictor. A warning signal is generated by a warning determiner depending on that a sum of each reduction in the fuel efficiency exceeds a threshold value. A warning is issued to a driver by a warner receiving the warning signal.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings.

Figure 1:
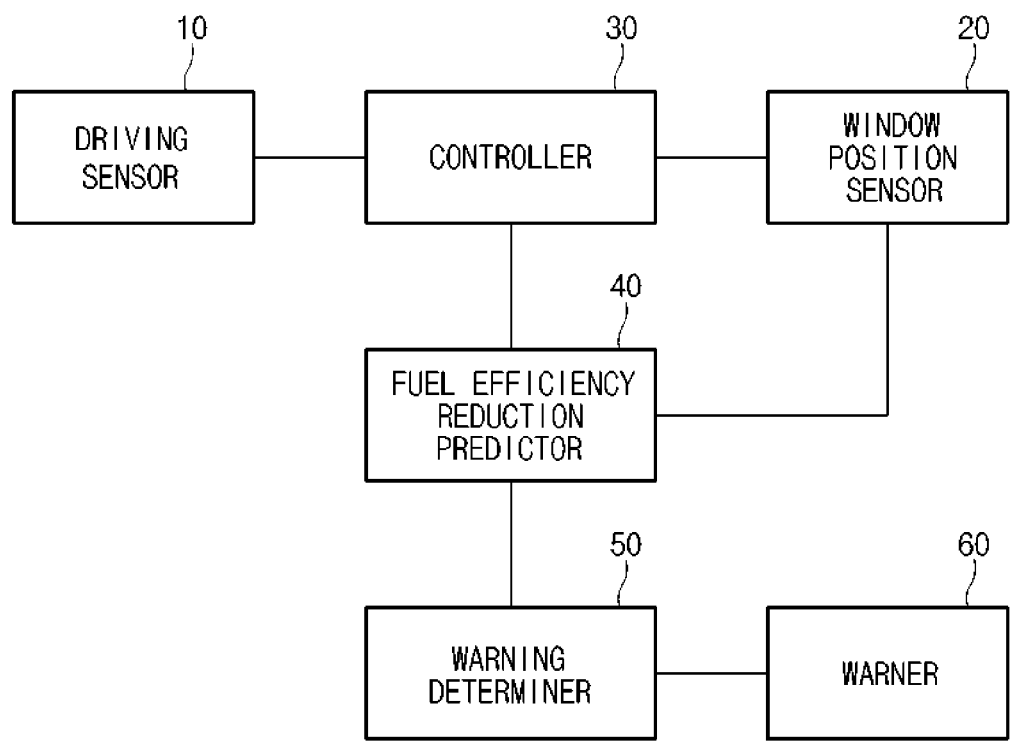
FIG. 1 is a configuration diagram of an apparatus for warning reduction in fuel efficiency of a vehicle according to an exemplary embodiment of the present disclosure.

FIG. 1 is a configuration diagram of an apparatus for warning reduction in fuel efficiency of a vehicle according to an exemplary embodiment of the present disclosure. As illustrated in FIG. 1, an apparatus for warning reduction in fuel efficiency according to an exemplary embodiment of the present disclosure includes a driving sensor 10, a window position sensor 20, a controller 30, a fuel efficiency reduction predictor 40, a warning determiner 50, and a warner 60.

Describing each component, the driving sensor 10 senses whether the vehicle is driven, based on a vehicle network. In this case, the driving sensor 10 may know whether the vehicle is driving, based on a vehicle start, a speedometer of a cluster, and the like. Herein, the vehicle network includes a controller area network (CAN), a local interconnect network (LIN), a FlexRay, a media oriented system transport (MOST), and the like.

The driving sensor 10 may determine that the vehicle is driving only when a driving speed exceeds a predetermined speed. In this case, the predetermined speed may be freely set. For example, when the vehicle speed exceeds 30 kph or 60 kph, it may be determined that the vehicle is driving. When the vehicle speed exceeds 100 kph, it may also be determined that the vehicle is driving.

The window position sensor 20 is, for example, a hall sensor and senses an opened degree of each window in the vehicle. That is, the window position sensor 20 senses whether each window within the vehicle is closed or opened and senses how much the window is opened in a percentage (%) if the window is opened. The window position sensor 20 senses an opened degree of a driver's side window, a passenger's side window, and left/right rear side windows of the vehicle.

The controller 30 controls each component to normally perform their own functions. In particular, the controller 30 enables the fuel efficiency reduction predictor 40 when the window position sensor 20 confirms that the vehicle window is opened in the state in which the driving sensor 10 senses the driving of the vehicle. Further, when all the windows of the vehicle are closed, the fuel efficiency reduction predictor 40 is not enabled.

The fuel efficiency reduction predictor 40 predicts the reduction in fuel efficiency depending on the opened degree of each window which is sensed by the window position sensor 20. That is, the fuel efficiency reduction predictor 40 predicts that the reduction in fuel efficiency does not occur when the window is closed and allocates 0 as a result value. When the opened degree of the window is in a first range (for example, 30% or less), the fuel efficiency reduction predictor 40 predicts that the reduction in fuel efficiency of 1% occurs and allocates 1 as a result value. When the opened degree of the window is in a second range (for example, more than 30% but less than 70%), the fuel efficiency reduction predictor 40 predicts that the reduction in fuel efficiency of 2% occurs and allocates 2 as a result value. When the opened degree of the window is in a third range (for example, exceeding 70%), the fuel efficiency reduction predictor 40 predicts that the reduction in fuel efficiency of 3% occurs and allocates 3 as a result value.

The warning determiner 50 determines whether a sum of the allocated values exceeds a threshold value (for example, 6) depending on the opened degree of each window using the fuel efficiency reduction predictor 40. If it is determined that the sum of the allocated values exceeds the threshold value, the warning determiner 50 generates a warning signal and transfers the generated warning signal to the warner 60.

For example, assume that the driver's side window is opened by 40%, the passenger's side window is opened by 10%, the right rear side window is opened by 80%, and the left rear side window is closed. In this case, the reduction in fuel efficiency of the driver's side window is set to be 2, the reduction in fuel efficiency of the passenger's side window is set to be 1, the reduction in fuel efficiency of the right rear side window is set to be 3, and the reduction in fuel efficiency of the left rear side is set to be 0. Therefore, since the sum of each reduction in fuel efficiency is set to be 6 (=2+1+3+0), the warning determiner 50 does not exceed the threshold value (for example, 6), and therefore does not generate the warning signal.

As another example, assume that the driver's side window is opened by 100%, the passenger's side window is opened by 10%, the right rear side window is opened by 80%, and the left rear side window is closed. In this case, the reduction in fuel efficiency of the driver's side window is set to be 3, the reduction in fuel efficiency of the passenger's side window is set to be 1, the reduction in fuel efficiency of the right rear side window is set to be 3, and the reduction in fuel efficiency of the left rear side is set to be 0. Since the sum of each reduction in fuel efficiency is set to be 7 (=3+1+3+0), the warning determiner 50 exceeds the threshold value (for example, 6), and therefore generates the warning signal and transfers the generated warning signal to the warner 60.

The warner 60 is, for example, a cluster module, and when receiving the warning signal from the warning determiner 50, displays a warning message or turns on/off a warning light. In this case, the warning message may be "Due to the opening of the current window, fuel economy is experiencing degradation. Close the window" and the like. The apparatus for warning the reduction in fuel efficiency further includes an ON/OFF switch for the driver to control the operation.

Figure 2:
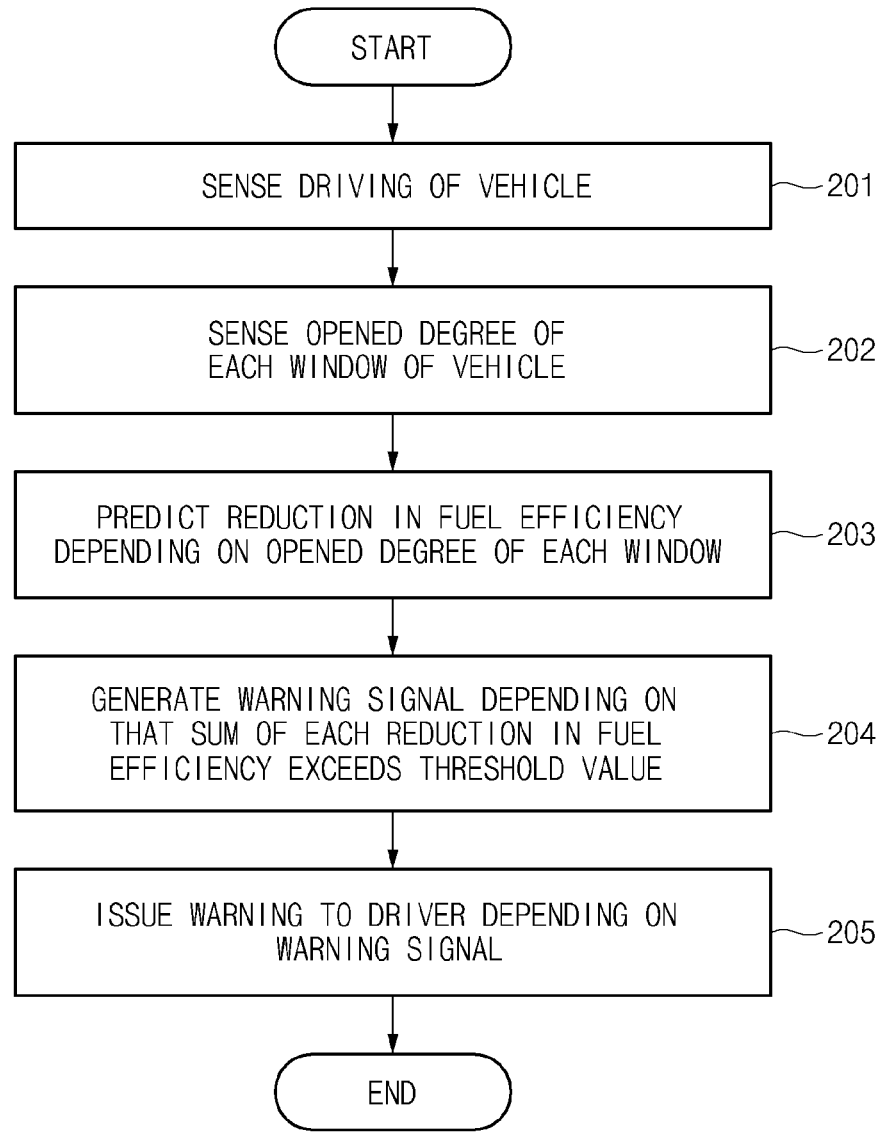
FIG. 2 is a flow chart of a method for warning reduction in fuel efficiency of a vehicle according to an exemplary embodiment of the present disclosure.

FIG. 2 is a flow chart of a method for warning reduction in fuel efficiency of a vehicle according to an exemplary embodiment of the present disclosure.

First, the driving sensor 10 senses driving of the vehicle (201). The window position sensor 20 then senses an opened degree of each window in the vehicle (202). The fuel efficiency reduction predictor 40 predicts the reduction in fuel efficiency depending on the opened degree of each window which is sensed by the window position sensor 20 (203). The warning determiner 50 generates the warning signal depending on that the sum of each reduction in fuel efficiency predicted by the fuel efficiency reduction predictor 40 exceeds the threshold value (204). Next, the warner 60, which receives the warning signal, issues a warning to a driver (205).

The method according to an exemplary embodiment of the present disclosure as described above may be prepared by a computer program. Codes and code segments configuring the computer program may be easily deduced by computer programmers in the art. In addition, the computer program is stored in computer readable recording media (information storage media) and is read and executed by computers, thereby implementing the methods according to the present disclosure. Further, the recording medium may include any type of recording media which may be read by a computer.

As described above, according to the exemplary embodiments of the present disclosure, it is possible to prevent the fuel efficiency from reducing due to the opening of the window by predicting the reduction in fuel efficiency depending on the opened degree of the driver's side window, the passenger's side window, and the rear side window of the vehicle while driving and displaying the case in which a predicted value exceeds a preset limit on the cluster to issue a warning to the driver.

The present disclosure described above may be variously substituted, altered, and modified by those skilled in the art to which the present disclosure pertains without departing from the scope and spirit of the present disclosure. Therefore, the present disclosure is not limited to the above-mentioned exemplary embodiments and the accompanying drawings.

What is claimed is:

1. An apparatus for warning reduction in fuel efficiency of a vehicle, the apparatus comprising:
    a driving sensor configured to sense driving of the vehicle;
    a window position sensor configured to sense an opened degree among a plurality of detectable opened degree ranges of each window in the vehicle;
    a controller configured to enable a fuel efficiency reduction predictor to start predicting, in real time, reduction in fuel efficiency depending on the opened degree of each window sensed by the window position sensor only when the window position sensor senses that a window of the vehicle is opened, upon sensing the driving of the vehicle by the driving sensor;

a warning determiner configured to generate a warning signal depending on a sum of reduction in fuel efficiency for the windows, which is predicted by the fuel efficiency reduction predictor, exceeding a threshold value; and a warner configured to issue a warning to a driver depending on a warning signal from the warning determiner.

2. The apparatus according to claim 1, wherein the fuel efficiency reduction predictor predicts that the reduction in fuel efficiency does not occur when the window is closed, predicts that the reduction in fuel efficiency of 1% occurs when the opened degree of the window is in a first range, predicts that the reduction in fuel efficiency of 2% occurs when the opened degree of the window is in a second range, and predicts that the reduction in fuel efficiency of 3% occurs when the opened degree of the window is in a third range.

3. The apparatus according to claim 1, wherein the driving sensor senses the driving of the vehicle when a speed of the vehicle exceeds a reference speed.

4. The apparatus according to claim 1, wherein the driving sensor senses the driving of the vehicle based on at least one of a controller area network (CAN), a local interconnect network (LIN), FlexRay, and a media oriented system transport (MOST).

5. The apparatus according to claim 1, wherein the window position sensor is a hall sensor.

6. The apparatus according to claim 1, further comprising:

an on/off switch configured to operate the apparatus for warning reduction in fuel efficiency of the vehicle.

7. A method for warning reduction in fuel efficiency of a vehicle, the method comprising steps of:

sensing, by a driving sensor, driving of the vehicle;

sensing, by a window position sensor, an opened degree among a plurality of detectable opened degree ranges of each window in the vehicle;

predicting, by a fuel efficiency reduction predictor, reduction in fuel efficiency depending on the opened degree of each window;

generating, by a warning determiner, a warning signal depending on a sum of reduction in fuel efficiency for the windows, which is predicted by the fuel efficiency reduction predictor, exceeding a threshold value; and issuing, by a warner receiving the warning signal, a warning to a driver, wherein a controller enables the fuel efficiency reduction predictor to start predicting, in real time, the reduction in fuel efficiency only when the window position senses that a window of the vehicle is opened upon sensing the driving of the vehicle.

8. The method according to claim 7, wherein the step of predicting the reduction in fuel efficiency includes:

predicting that the reduction in fuel efficiency does not occur when the window is closed;

predicting that the reduction in fuel efficiency of 1% occurs when the opened degree of the window is in a first range;

predicting that the reduction in fuel efficiency of 2% occurs when the opened degree of the window is in a second range; and predicting that the reduction in fuel efficiency of 3% occurs when the opened degree of the window is in a third range.

9. The method according to claim 7, wherein in the step of sensing the driving, the driving of the vehicle is sensed when a speed of the vehicle exceeds a reference speed.

* * * * *